United States Patent
Oh et al.

(10) Patent No.: US 11,139,475 B2
(45) Date of Patent: Oct. 5, 2021

(54) LITHIUM SECONDARY BATTERY AND MANUFACTURING METHOD THEREOF

(71) Applicants: Hyundai Motor Company, Seoul (KR); Kia Motors Corporation, Seoul (KR); Industry Academy Cooperation Foundation of Sejong University, Seoul (KR)

(72) Inventors: Seung-Min Oh, Incheon (KR); KiSeok Koh, Gyeonggi-Do (KR); Yeolmae Yeo, Gyeonggi-Do (KR); Dongjun Kim, Gyeonggi-Do (KR); Yoon Sung Lee, Gyeonggi-do (KR); Jieun Lee, Gyeonggi-Do (KR); Sa Heum Kim, Gyeonggi-do (KR); Seung-Taek Myung, Seoul (KR)

(73) Assignees: Hyundai Motor Company, Seoul (KR); Kia Motors Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 73 days.

(21) Appl. No.: 16/391,118

(22) Filed: Apr. 22, 2019

(65) Prior Publication Data
US 2020/0168905 A1    May 28, 2020

(30) Foreign Application Priority Data
Nov. 28, 2018 (KR) .................. 10-2018-0149923

(51) Int. Cl.
*H01M 4/505* (2010.01)
*H01M 10/0525* (2010.01)
(Continued)

(52) U.S. Cl.
CPC ............... *H01M 4/505* (2013.01); *B60K 6/28* (2013.01); *B60L 50/64* (2019.02); *B60R 16/033* (2013.01);
(Continued)

(58) Field of Classification Search
CPC ............. H01M 4/505; H01M 10/0525; H01M 2004/028; H01M 2220/20; B60L 50/64;
(Continued)

(56) References Cited

U.S. PATENT DOCUMENTS

2009/0305132 A1* 12/2009 Gauthier ............... H01M 4/485
                                                                    429/207
2019/0181446 A1*  6/2019 Hayashi ................ H01M 4/364
(Continued)

OTHER PUBLICATIONS

Naoaki Yabuuchi, et al., Nature Communications, DOI: 10,1038/ncomms13814, published Dec. 23, 2016.

*Primary Examiner* — Milton I Cano
*Assistant Examiner* — Jenna Shulman
(74) *Attorney, Agent, or Firm* — Mintz Levin Cohn Ferris Glovsky and Popeo, P.C.; Peter F. Corless

(57) ABSTRACT

Provided is a lithium secondary battery with improved t electrochemical characteristics through improvement of the structural stability by including a cathode active material doped with molybdenum (Mo). The lithium secondary battery includes a cathode; an anode; a separator positioned between the cathode and the anode; and an electrolyte. In particular, the cathode active material includes molybdenum (Mo) doped on a composite oxide of lithium and metal including manganese (Mn) and titanium (Ti).

4 Claims, 5 Drawing Sheets

(51) Int. Cl.
  *B60L 50/64* (2019.01)
  *B60K 6/28* (2007.10)
  *B60R 16/033* (2006.01)
  *H01M 4/02* (2006.01)
(52) U.S. Cl.
  CPC ..... *H01M 10/0525* (2013.01); *B60Y 2200/91* (2013.01); *B60Y 2200/92* (2013.01); *B60Y 2400/112* (2013.01); *H01M 2004/028* (2013.01); *H01M 2220/20* (2013.01)
(58) Field of Classification Search
  CPC ... B60K 6/28; B60R 16/033; B60Y 2400/112; B60Y 2200/91; B60Y 2200/92
  See application file for complete search history.

(56) References Cited

U.S. PATENT DOCUMENTS

| | | | |
|---|---|---|---|
| 2020/0020929 A1* | 1/2020 | Yoshida | H01M 10/0562 |
| 2020/0168896 A1* | 5/2020 | Kumakura | C04B 35/62222 |

* cited by examiner

FIRST COMPARATIVE EXAMPLE

FIRST EXEMPLARY EMBODIMENT

SECOND EXEMPLARY EMBODIMENT

THIRD EXEMPLARY EMBODIMENT

LITHIUM SECONDARY BATTERY AND MANUFACTURING METHOD THEREOF

CROSS-REFERENCE TO RELATED APPLICATION

This application is based on and claims priority under 35 U.S.C. § 119 to Korean Patent Application No. 10-2018-0149923, filed on Nov. 28, 2018 in the Korean Intellectual Property Office, the disclosure of which is incorporated herein by reference.

TECHNICAL FIELD

The present invention relates to a lithium secondary battery.

BACKGROUND

In the related art, a lithium secondary battery containing electro active materials has a higher operating voltage and a higher energy density compared to a lead battery or a nickel/cadmium battery. Accordingly, the lithium secondary battery has been used as energy storage devices for electric vehicles (EVs) and hybrid electric vehicles (HEVs).

In order to improve the mileage of an electric vehicle, battery energy densification is required and thus, energy density of the material needs to be improved. For instance, lithium secondary batteries using Ni, Co, and Mn based cathode materials and graphite based anode materials have been developed, but there are various attempts to develop alternative materials to improve limitations in the energy density.

SUMMARY

In preferred aspect, provided is a lithium secondary battery with improved electrochemical characteristics through improvement of the structural stability by including a cathode active material doped with molybdenum (Mo).

Additional aspects of the invention will be set forth in part in the description which follows and, in part, will be obvious from the description, or may be learned by practice of the invention.

In an aspect, provided is a lithium secondary battery including: a cathode; an anode; a separator positioned between the cathode and the anode; and an electrolyte. In particular, the cathode may include a cathode active material that includes molybdenum (Mo) and a composite oxide of lithium (Li) and a metal component. Preferably, the metal component may include manganese (Mn) and titanium (Ti).

The term "composite oxide" as used herein refers to a composite material that includes one or more oxides, e.g., oxide of lithium and other metal oxides. In certain embodiments, the composite oxide may be formed with i) oxide of lithium and ii) the metal component oxides that includes Mn and Ti.

Preferably, the cathode active material may include molybdenum (Mo) that may be doped on a composite oxide, i.e. the composite oxide including the lithium oxide and the oxides including manganese (Mn) and titanium (Ti).

The cathode active material may suitably include a composite having the following formula,

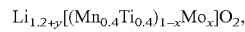

wherein x may have a value in a range of 0.05≤x≤0.1 and y may have a value in a range of 0<y≤0.03.

In another aspect, provided is a method of manufacturing a lithium secondary battery. The method may include: performing milling on metal oxides; drying the milled metal oxides; and performing heat treatment on the dried metal oxides to obtain a cathode active material. Preferably, the metal oxides may include oxides of lithium (Li), manganese (Mn), titanium (Ti) and molybdenum (Mo). The metal oxides may suitably include $Li_2CO_3$, $Mn_2O_3$, $TiO_2$ and $Mo_2O_5$.

Preferably, the cathode active material may include molybdenum (Mo) doped on a composite including the oxide of lithium and the oxides of manganese (Mn) and titanium (Ti).

Preferably, the mill may be performed by ball milling. The ball milling may be repeated two or more times each for about 15 minutes at a rotation speed of about 300 rpm. For instance, the ball milling is repeated 17 times.

The heat treatment may be performed in an argon (Ar) atmosphere at a temperature of about 900° C. for about 12 hours.

The cathode active material may include a composite having the following formula,

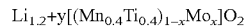

wherein x may have a value in a range of 0.05≤x≤0.1 and y may have a value in a range of 0<y≤0.03.

Further provided is a vehicle that may include the lithium secondary batter as described herein.

Other aspect of the invention are disclose infra.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
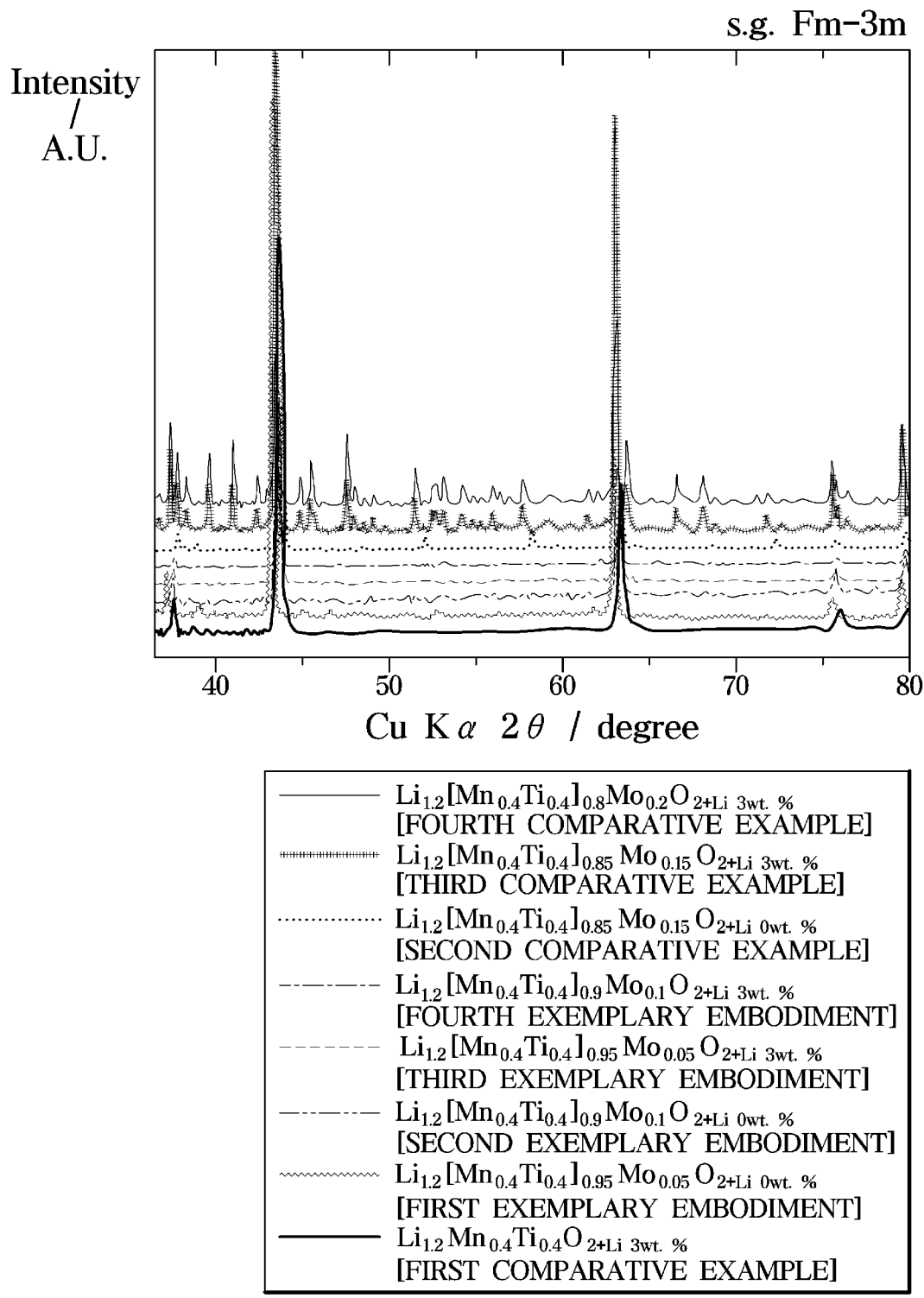
FIG. 1 shows X-ray diffraction patterns of an exemplary cathode active material according to an exemplary embodiment.

Like numerals refer to like elements throughout the specification. Not all elements of exemplary embodiments of the present disclosure will be described, and description of what are commonly known in the art or what overlap each other in the exemplary embodiments will be omitted.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings and tables. Accordingly, a lithium secondary battery is described, and then a binder according to an exemplary embodiment will be described.

In an aspect, a lithium secondary battery generally may include a cathode, an anode, a separator, and an electrolyte. The cathode, the anode, and the separator constituting an electrode structure may include typical cathode, anode, and separator used in manufacturing the conventional lithium secondary batteries.

An electrode may include an electrode active material and a binder. For instance, the electrode according to an exemplary embodiment may be formed by applying an electrode slurry having a mixture of an electrode active material, a binder, a solvent, and a conductive material, if necessary, to an electrode current collector by a predetermined thickness, and then drying and rolling the electrode current collector having the electrode slurry thereto applied.

An anode active material used for manufacturing the anode may be implemented using any anode active material, which may serve to insert and extract lithium ions. The anode active material may include materials that may allow lithium to be reversibly adsorbed or extracted and/or metal materials that may form an alloy with lithium.

Exemplary materials that may allow lithium to be reversibly adsorbed or extracted may suitably include one or more material selected from the group consisting of artificial graphite, natural graphite, graphitized carbon fiber, graphitized mesocarbon microbead, fullerene, and amorphous carbon.

Examples of the amorphous carbon may suitably include hard carbon, coke, or mesocarbon microbeads (MCMB) and mesophase pitch-based carbon fiber (MPCF) calcined at the temperature of about 1500° C. or less. The metal material that may form an alloy with lithium may suitably include one or more metals selected from the group consisting of Al, Si, Sn, Pb, Zn, Bi, In, Mg, Ga, Cd, Ni, Ti, Mn and Ge. These metal materials may be used alone, in a mixture, or in an alloy. In addition, such a metal may be used in the form of a composite mixed with a carbon-based material.

For instance, the anode active material may suitably include a composite of a graphite-based anode active material and a silicon-based anode active material.

The silicon-based anode active material may suitably include silicon oxides, silicon particles, and silicon alloy particles. Representative examples of the silicon alloy may include a solid solution including aluminum (Al), manganese (Mn), iron (Fe), titanium (Ti), and the like and silicon; an intermetallic compound with silicon, and a eutectic alloy with silicon, but the silicon alloy according to the present disclosure is not limited thereto.

A cathode active material used for manufacturing the cathode according to an exemplary embodiment of the present invention may include a compound that promote or induce reversible intercalation and deintercalation of lithium. Preferably, the cathode active material may suitably include one or more of composite oxides including lithium and one or more metal selected from the group consisting of cobalt (Co), manganese (Mn), and nickel (Ni).

Meanwhile, cathode materials, in which nickel having a high energy density is present in an amount of 80% or greater, may be very sensitive in the atmosphere and are not easy in synthesis. Using lithium-rich materials may provide a high capacity of about 250 mAh/g or greater in the voltage range of about 2V to 4.2 V, but the reaction mechanism how the high capacity is achieved and the cause of performance deterioration have not been clearly identified.

Accordingly, provided herein is a cathode active material having a composition or a structure that are distinguished from those described above in the related arts. For instance, molybdenum (Mo) may be suitably doped on $Li_{1.2}Ti_{0.4}Mn_{0.4}O_2$ having an initial capacity of about 300 mAh/g and a life characteristic of about 85% after 10 cycles, to thereby provide a lithium secondary battery with improved structural stability and electrochemical characteristics. Details thereof will be described below.

In addition to the above described electrode active materials and binders, the electrode according to an exemplary embodiment of the present invention may further include other components, such as a dispersion medium, a conductive material, a viscosity modifier, and a filler, as additives.

The separator may prevent a short circuit between the cathode and the anode and provide a passage for lithium ions. The separator may suitably include i) a polyolefin-based polymer membrane, for example, including one or more of polypropylene, polyethylene, polyethylene/polypropylene, polyethylene/polypropylene/polyethylene, polypropylene/polyethylene/polypropylene, or a multilayer thereof, ii) a microporous film, iii) woven fabric, or nonwoven fabric that are generally known in the art. Preferably, the porous polyolefin film coated with a highly stable resin may be used for the separator. When a solid electrolyte, such as a polymer, is used as an electrolyte, the solid electrolyte may also serve as a separator.

The electrolyte may suitably include: lithium salt; and a non-aqueous organic solvent, and may further include additives for improving charge/discharge characteristics, preventing overcharge, and the like. Preferably, the lithium salt may suitably include one or more lithium salts selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, LiFSI and $(CF_3SO_2)_2NLi$.

The non-aqueous organic solvent may suitably include one or more of carbonate, ester, ether and ketone. Examples of the carbonate may suitably include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), Propylene carbonate (PC), butylene carbonate (BC), fluoroethylene carbonate (FEC), and the like. The ester may suitably include γ-Butyrolactone (GBL), n-methyl acetate, n-ethyl acetate, n-propyl acetate and the like. The ether may suitably include dibutyl ether and the like. The non-aqueous organic solvent may include a typical non-aqueous organic solvent in the related art, but not limited thereto.

The non-aqueous organic solvent may further include an aromatic hydrocarbon-based organic solvent. Examples of the aromatic hydrocarbon-based organic solvent may suitably include one or more benzene, fluorobenzene, bromobenzene, chlorobenzene, cyclohexylbenzene, isopropylbenzene, n-butylbenzene, octylbenzene, toluene, xylene, mesitylene, and the like.

Hereinafter, the cathode of the lithium secondary battery according to the various exemplary embodiments will be described in detail. In the following description, the unit of measurement is weight % (wt %) unless otherwise stated.

The cathode active material of the cathode according to an exemplary embodiment may include a material in which molybdenum (Mo) and metal oxides including at least the oxide of lithium. The metal oxides may include the oxide of lithium and the other oxides including manganese oxides and titanium oxide. Preferably, the molybdenum may be supplied in a form of $Mo_2O_5$, for example, and the Mo may be doped on a composite oxide, i.e. metal oxides of lithium and the metal oxides including manganese (Mn) and titanium (Ti). The cathode active material may have a composite having the following formula, $$Li_{1.2+y}[(Mn_{0.4}Ti_{0.4})_{1-x}Mo_x]O_2.$$

For instance, in the cathode active material having the above formula, x indicating the ratio of molybdenum may suitably have a value in the range of $0.05 \leq x \leq 0.1$; and y indicating the ratio at which lithium is contained in excess may suitably have a value in the range of $0 < y \leq 0.03$.

In the related art, the cathode active material may conventionally include $Li_{1.2}Ti_{0.4}Mn_{0.4}O_2$, which may exhibit an atmospheric instability, a structural instability, low lifetime characteristics, and low power characteristics. Further, in an exemplary embodiment of the present invention, molybdenum-doped cathode active material, for example, having the formula $Li_{1.2+y}[(Mn_{0.4}Ti_{0.4})_{1-x}Mo_x]O_2$ may have substantially improved structural stability and electrochemical characteristics.

The lithium secondary battery using the cathode active material according to various exemplary embodiments may not include an expensive transition metal as compared to the conventional cathode active material, thereby enhancing the economic efficiency. In addition, the lithium secondary battery according to various exemplary embodiments may achieve a capacity greater than about 280 mAh/g that is higher than that of the existing cathode with a capacity limit of about 210 mAh/g. In addition, the lithium secondary battery according to various exemplary embodiment may have substantially improved structural stability and electrochemical stability due to doping of molybdenum as compared to the above-described cathode active material of $Li_{1.2}Ti_{0.4}Mn_{0.4}O_2$.

EXAMPLE

Hereinafter, a method of manufacturing a cathode active material according to an exemplary embodiment and a method of manufacturing an electrode of a lithium secondary battery will be described.

Example 1: First Exemplary Embodiment

The first exemplary embodiment was performed by ball milling using $Li_2CO_3$, $Mn_2O_3$ (synthesized by calcinating $MnCO_3$), $TiO_2$ and $Mo_2O_5$ together with an anhydrous ethanol solvent. According to the first exemplary embodiment, the materials were added according to the composition of $Li_{1.2}[(Mn_{0.4}Ti_{0.4})_{0.95}Mo_{0.05}]O_2$. For the ball milling, $ZrO_2$ balls with a size of 10 mm in an amount of 5 g, $ZrO_2$ balls with a size of 5 mm in an amount of 10 g, and $ZrO_2$ balls with a size of 1 mm in an amount of 4 g were introduced. The ball millings were performed in 17 sets each at a rotation speed of 300 rpm for 15 minutes. After the ball milling, the cathode active materials were washed with ethanol, dried, and pelletized. Then, the cathode active materials were subject to calcination in the Ar atmosphere at a temperature of 900° C. for 12 hours, to thereby obtain cathode active material powder.

Example 2: Second Exemplary Embodiment

The cathode active material powder was obtained in the same manner as in Example 1 except that molybdenum had a ratio of 0.1, to thereby obtain $Li_{1.2}Li_{1.2}[(Mn_{0.4}Ti_{0.4})_{0.9}Mo_{0.1}]O_2$.

Example 3: Third Exemplary Embodiment

The cathode active material powder was obtained in the same manner as in the first exemplary embodiment, except that an excess of lithium in an amount of 3 wt % was added.

Example 4: Fourth Exemplary Embodiment

The cathode active material powder was obtained in the same manner as in the second exemplary embodiment, except that an excess of lithium in an amount of 3 wt % was added.

Example 5: First Comparative Embodiment

The cathode active material powder was obtained in the same manner as in the first exemplary embodiment except that molybdenum was omitted and an excess of lithium in an amount of 3 wt % was added.

Example 6: Second Comparative Embodiment

The cathode active material powder was obtained in the same manner as in the first exemplary embodiment except that molybdenum had a ratio of 0.15, thereby obtaining $Li_{1.2}[(Mn_{0.4}Ti_{0.4})_{0.85}Mo_{0.15}]O_2$.

Example 7: Third Comparative Embodiment

The cathode active material powder was obtained in the same manner as in the second comparative example except that an excess of lithium in an amount of 3 w % was added.

Example 8: Fourth Comparative Embodiment

The cathode active material powder was obtained in the same manner as in the third comparative example except that molybdenum had a ratio of 0.2, thereby obtaining $Li_{1.2}[(Mn_{0.4}Ti_{0.4})_{0.8}Mo_{0.2}]O_2$.

FIG. 1 shows an XRD profile of a crystal structure according to the molybdenum content and an excess in the lithium content. As shown in FIG. 1, when the content of molybdenum was greater than about 0.1 (the second comparative example and the third comparative example), impurities were formed in the crystal structure. When the third exemplary embodiment and the fourth exemplary embodiment were compared with the third comparative example and the fourth comparative example, the crystal structure was normal until an excess of lithium was added in an amount of about 3 wt % and molybdenum had a content of 0.1.

Figure 2:
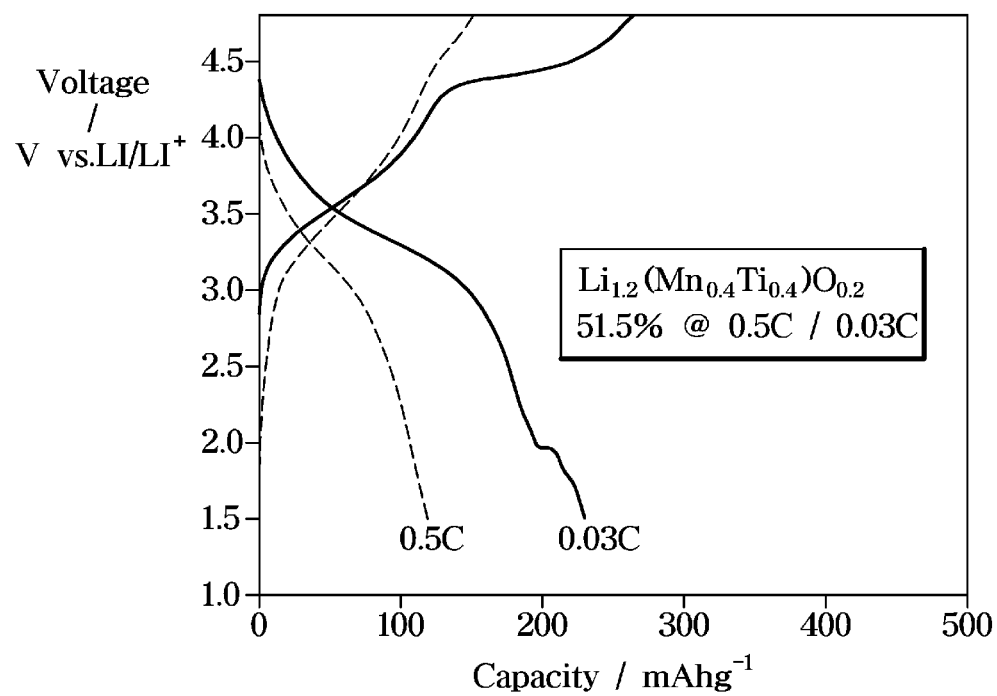
FIG. 2 shows an initial charge/discharge profile and a cycle performance profile of a cathode according to the first comparative example.
Figure 2:
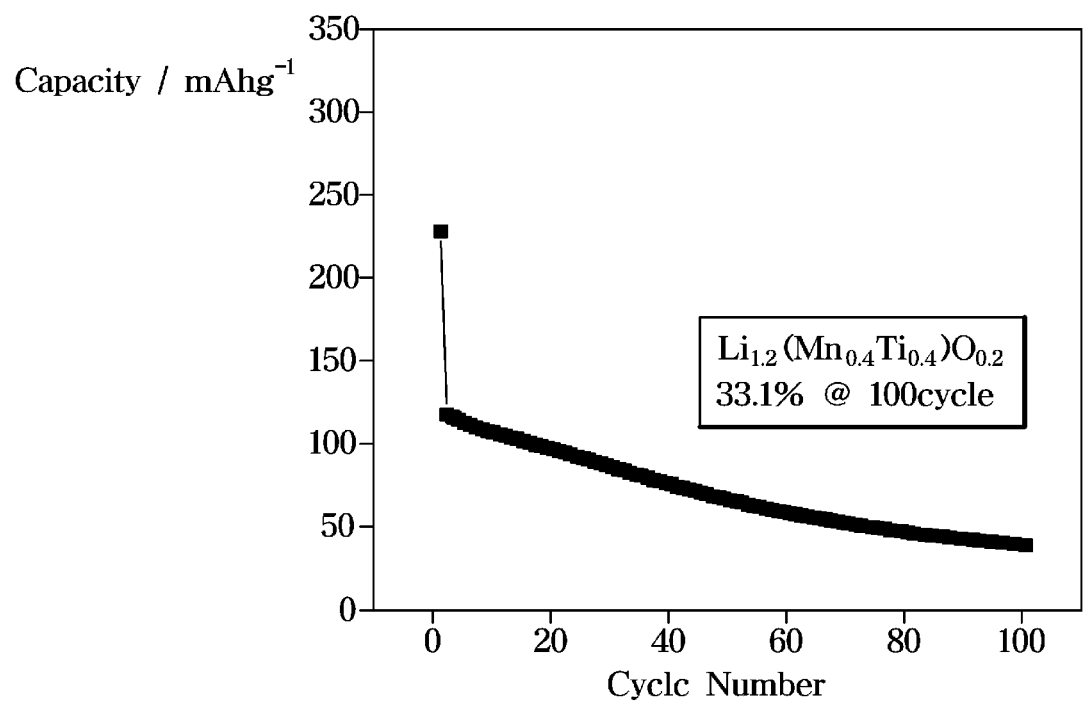
Figure 3:
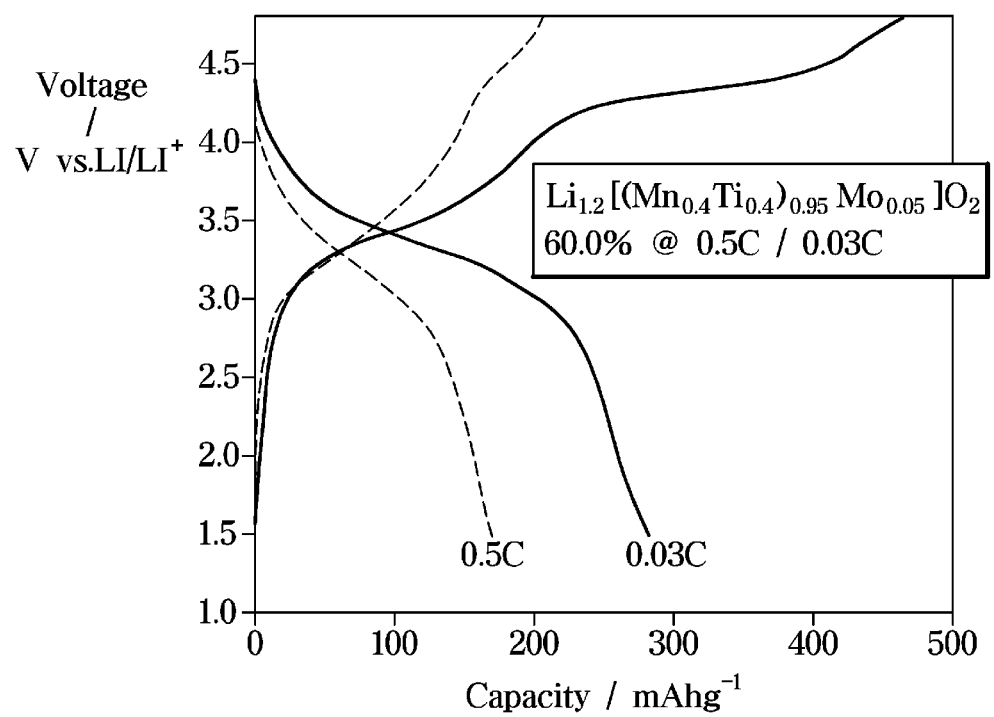
FIG. 3 shows an initial charge/discharge profile and a cycle performance profile of an exemplary cathode according to the first exemplary embodiment.
Figure 3:
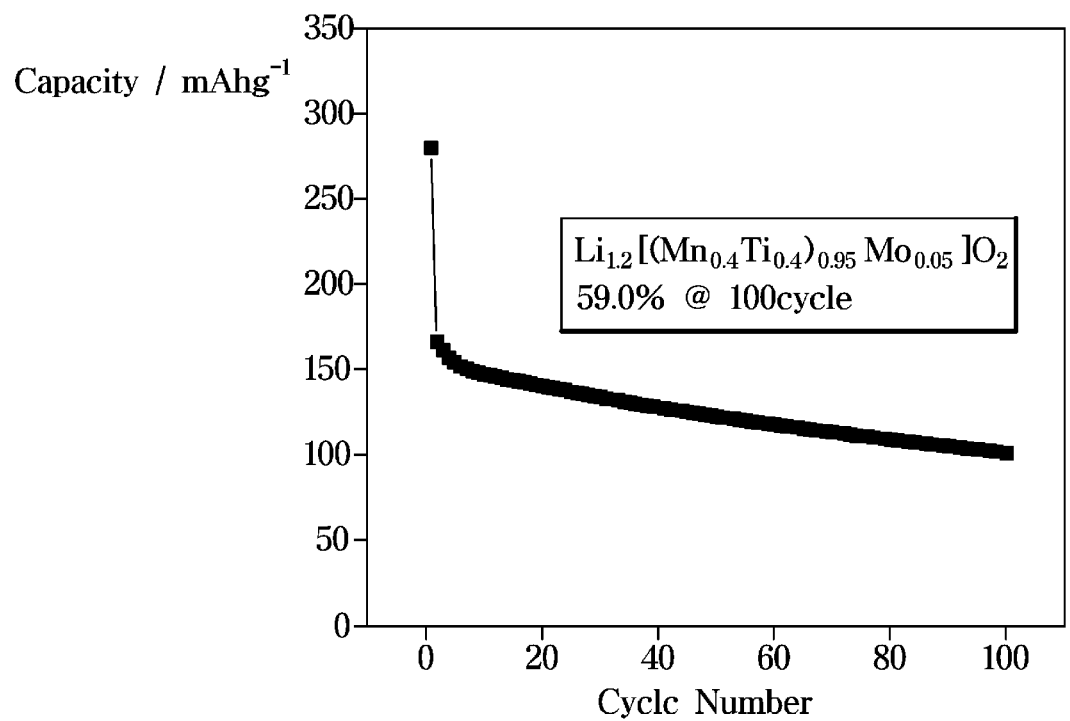
Figure 4:
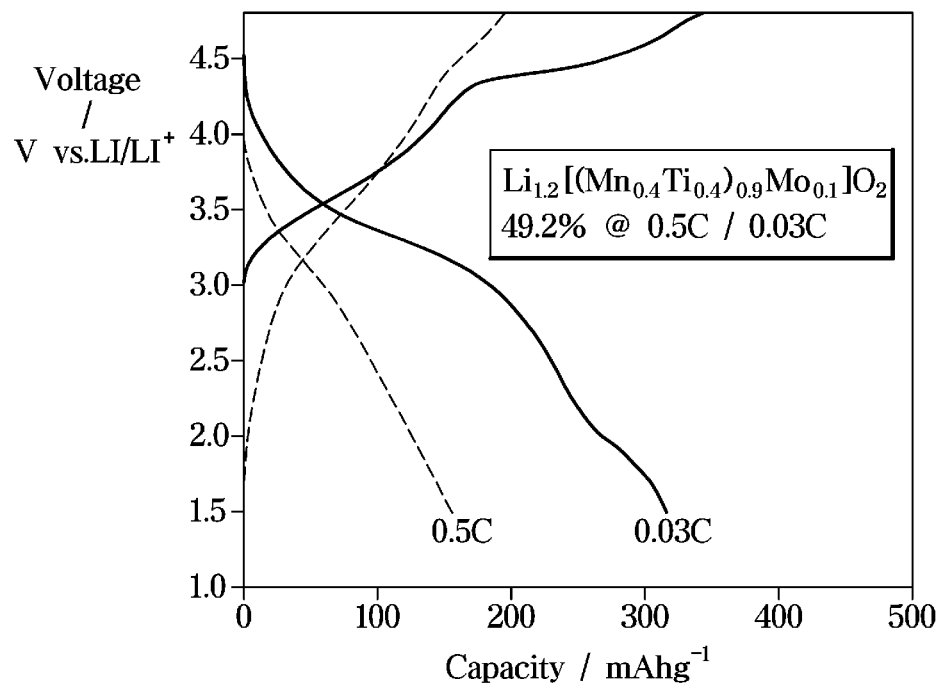
FIG. 4 shows an initial charge/discharge profile and a cycle performance profile of an exemplary cathode according to the second exemplary embodiment.
Figure 4:
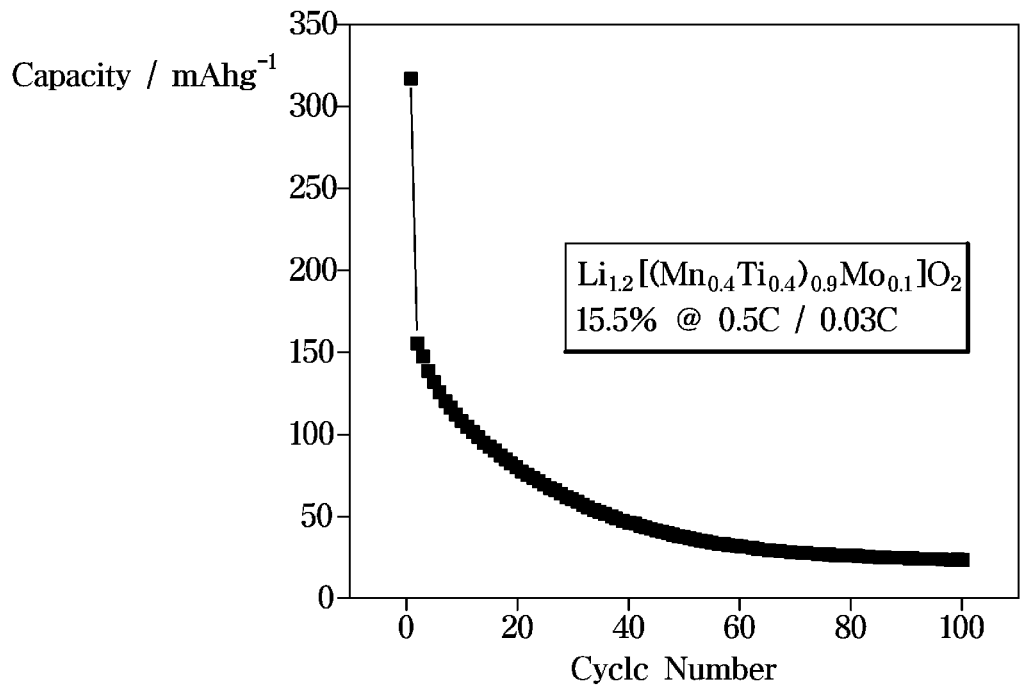
Figure 5:
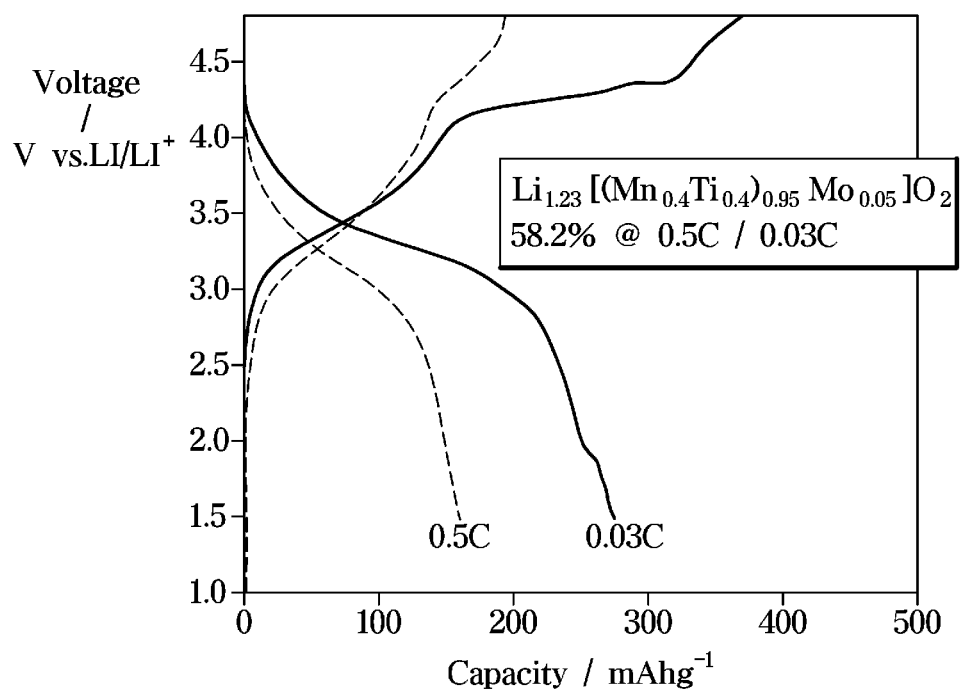
FIG. 5 shows an initial charge/discharge profile and a cycle performance profile of an exemplary cathode according to the third exemplary embodiment.
Figure 5:
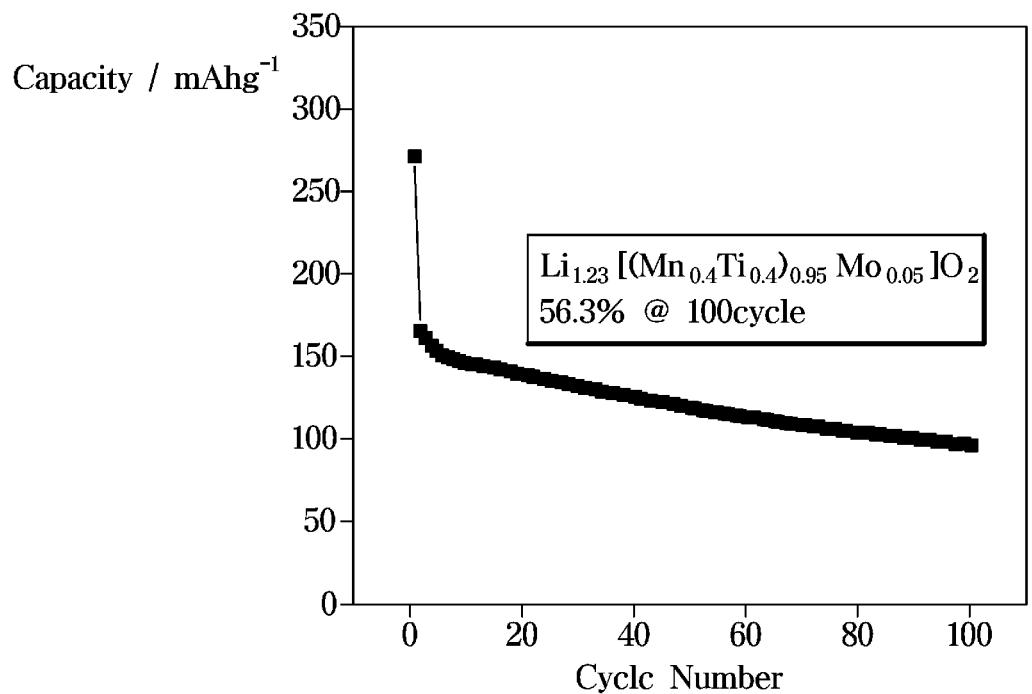

FIGS. 2 to 5 show the initial charge/discharge profile and the cycle performance profile of the cathode according to the first comparative example and the exemplary embodiments. FIG. 2 shows a voltage profile in the initial cycle obtained at 0.03 C and 0.5 C according to the first comparative example, FIG. 3 shows a voltage profile in the initial cycle obtained at 0.03 C and 0.5 C according to the first exemplary embodiment, FIG. 4 shows a voltage profile in the initial cycle obtained at 0.03 C and 0.5 C according to the second exemplary embodiment, and FIG. 5 shows a voltage profile in the initial cycle obtained at 0.03 C and 0.5 C according to the third exemplary embodiment. As shown in FIGS. 2 to 5, the first, second, and third exemplary embodiments had initial discharge capacities greater than that of the first comparative example, and the first and third exemplary embodiments had the hundredth cycle retentions of about 59% and about 58.2%, respectively, which indicates substantially improved stability compared to that of the first comparative example.

In various exemplary embodiments of the present invention, the lithium secondary battery and the manufacturing method thereof may provide a lithium secondary battery capable of realizing a high capacity compared to using the existing cathode by using an improved cathode active material.

In addition, the lithium secondary battery and the manufacturing method thereof may provide a lithium secondary battery having improved structural stability and electrochemical characteristics by using an improved cathode active material.

Although the exemplary embodiments of the present invention have been described with reference to the accompanying drawings, those skilled in the art will appreciate that these inventive concepts may be embodied in different forms without departing from the scope and spirit of the invention, and should not be construed as limited to the exemplary embodiments set forth herein. The provided exemplary embodiments have been described for illustrative purposes and not for limiting purposes.

What is claimed is:

1. A lithium secondary battery comprising:
a cathode;
an anode;
a separator positioned between the cathode and the anode; and
an electrolyte,
wherein the cathode comprises a cathode active material comprising molybdenum (Mo) and a composite oxide of lithium (Li) and a metal component,
wherein the cathode active material comprises a composite having the formula of:

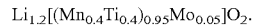

$$Li_{1.2}[(Mn_{0.4}Ti_{0.4})_{0.95}Mo_{0.05}]O_2.$$

2. The lithium secondary battery of claim 1, wherein the metal component comprises manganese (Mn) and titanium (Ti).

3. The lithium secondary battery of claim 1, the cathode active material comprises the molybdenum (Mo) doped on the composite oxide of the lithium and the metal component.

4. A vehicle comprising a lithium secondary battery of claim 1.

* * * * *